(12) United States Patent
Hare et al.

(10) Patent No.: US 10,177,543 B2
(45) Date of Patent: Jan. 8, 2019

(54) ELECTRICAL SWITCHGEAR MANUAL SAFETY SYSTEM AND MECHANISMS

(71) Applicant: M&I Electric Industries, Houston, TX (US)

(72) Inventors: Neal Thomas Hare, Katy, TX (US); Thomas Matthew Stevens, Groves, TX (US)

( * ) Notice: Subject to any disclaimer, the term of this patent is extended or adjusted under 35 U.S.C. 154(b) by 0 days.

(21) Appl. No.: 15/350,101

(22) Filed: Nov. 13, 2016

(65) Prior Publication Data

US 2017/0141549 A1 May 18, 2017

Related U.S. Application Data

(60) Provisional application No. 62/255,519, filed on Nov. 15, 2015.

(51) Int. Cl.
| | | |
|---|---|---|
| *H01H 71/52* | (2006.01) | |
| *H01H 71/04* | (2006.01) | |
| *H02B 1/30* | (2006.01) | |
| *E05B 65/00* | (2006.01) | |
| *H02B 11/133* | (2006.01) | |
| *E05B 47/02* | (2006.01) | |
| *H01H 71/02* | (2006.01) | |

(52) U.S. Cl.
CPC ............ *H02B 1/306* (2013.01); *E05B 47/02* (2013.01); *E05B 65/0089* (2013.01); *H01H 71/04* (2013.01); *H01H 71/52* (2013.01); *H02B 11/133* (2013.01); *H01H 71/0207* (2013.01)

(58) Field of Classification Search
CPC ...... H01H 71/04; H01H 71/505; H01H 71/46; H01H 83/20; H01H 71/525; H01H 71/52; H01H 75/04; H01H 3/30; H01H 71/0207; H01H 71/2463; H01H 71/126; H01H 83/04; H01H 73/50; H01H 1/226; H01H 71/0214; H01H 73/30; H01H 71/58; H01H 71/10; H01H 3/46; H02B 11/133; H02B 1/36; H02B 11/24; H02H 1/0015; H02H 1/06; H02H 3/335

See application file for complete search history.

(56) References Cited

U.S. PATENT DOCUMENTS

| | | | | |
|---|---|---|---|---|
| 2,215,299 A | * | 9/1940 | Runke | H01H 9/223 |
| | | | | 200/334 |
| 2,458,240 A | * | 1/1949 | Baskerville | H01H 3/60 |
| | | | | 200/337 |
| 3,197,582 A | * | 7/1965 | Norden | H01H 3/001 |
| | | | | 200/416 |

(Continued)

*Primary Examiner* — Adam B Dravininkas
(74) *Attorney, Agent, or Firm* — Orgain Bell & Tucker LLP; Cullen Kiker

(57) ABSTRACT

The disclosed invention ensures safe operation of an electrical switchgear by preventing an operator from contacting or interacting with an active circuit breaker. One way this is accomplished is through a locking system that prevents a door to the interior of the switchgear from opening until the circuit breaker is in a disengaged position. A second way this is accomplished is by a manipulation restriction system that prevents the circuit breaker from being manually moved unless the door is closed. Another way this is accomplished is by a circuit breaker decoupler, accessible from the exterior of the switchgear that can directly manipulate the circuit breaker into disengagement.

7 Claims, 14 Drawing Sheets

(56) References Cited

U.S. PATENT DOCUMENTS

| | | | | |
|---|---|---|---|---|
| 3,559,121 A * | 1/1971 | Powell | ............... | H01H 71/70 |
| | | | | 200/401 |
| 4,245,204 A * | 1/1981 | Clausing | ............ | H01H 71/322 |
| | | | | 335/174 |
| 5,477,016 A * | 12/1995 | Baginski | ............... | H01H 9/282 |
| | | | | 200/308 |
| 5,512,720 A * | 4/1996 | Coudert | ............... | H01H 83/12 |
| | | | | 200/318 |
| 6,225,881 B1 * | 5/2001 | Felden | ............... | H01H 71/04 |
| | | | | 335/167 |
| 8,563,887 B2 * | 10/2013 | Gottschalk | ......... | H01H 71/505 |
| | | | | 200/468 |
| 10,020,642 B2 * | 7/2018 | Oneufer | ............... | H02B 1/46 |

* cited by examiner

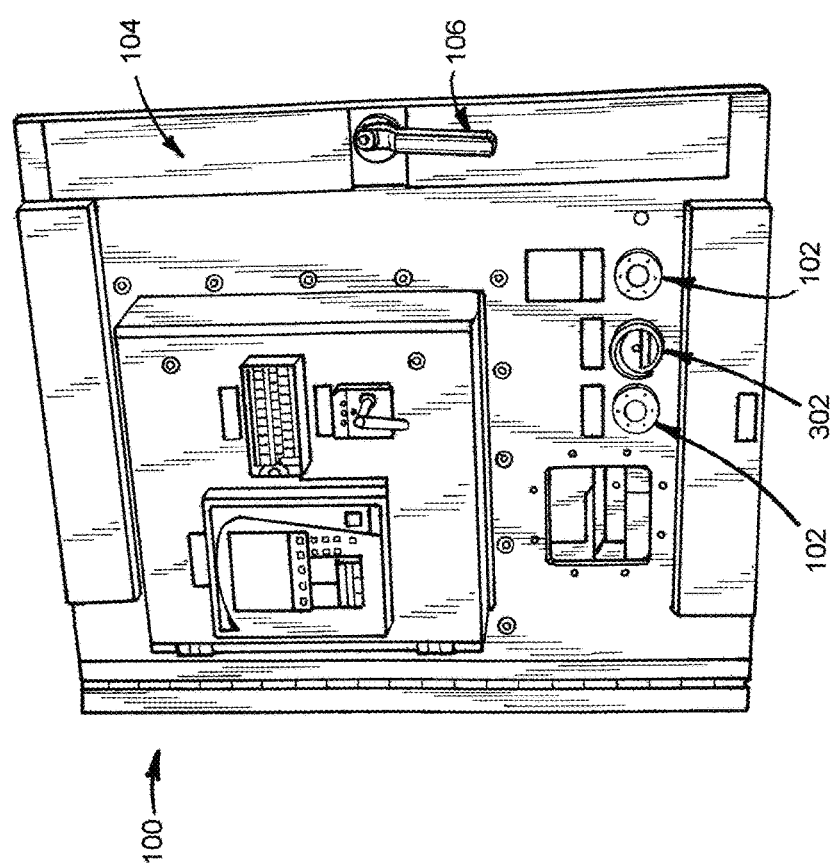

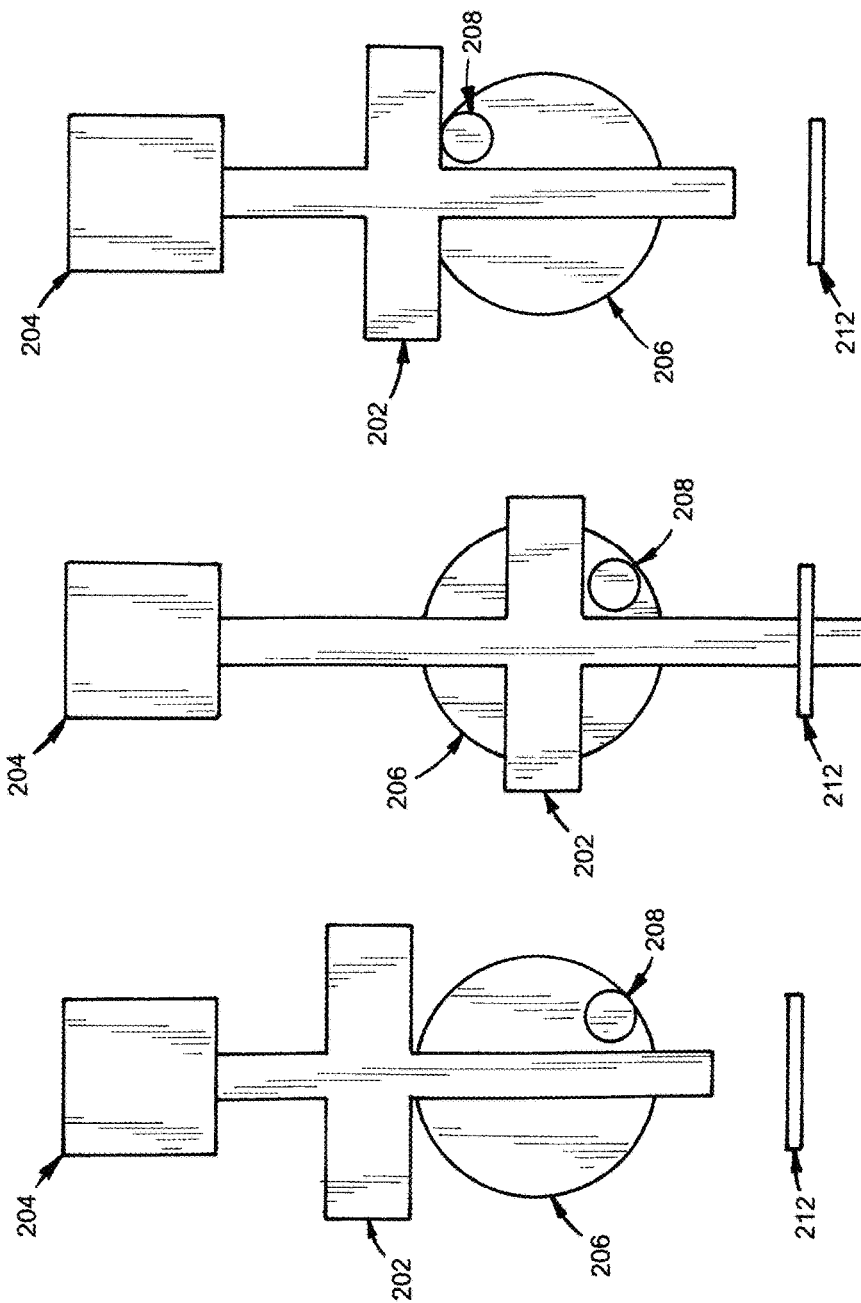

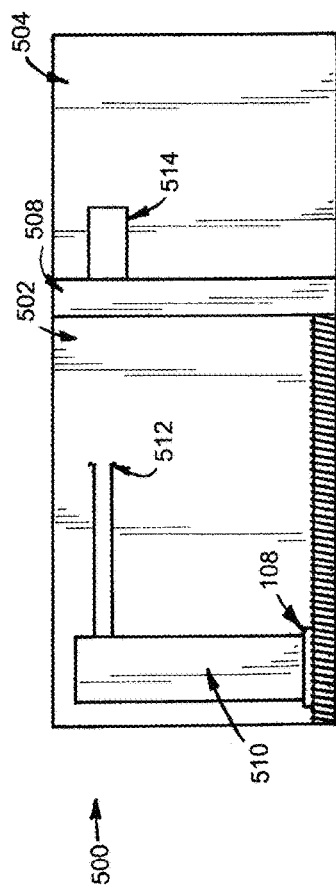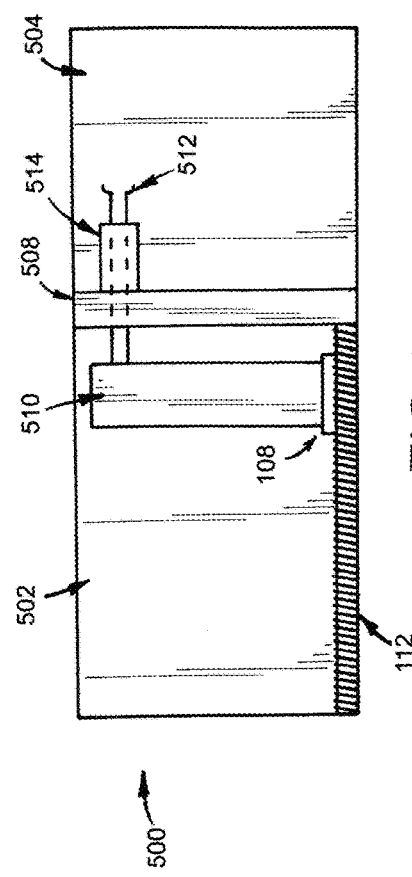

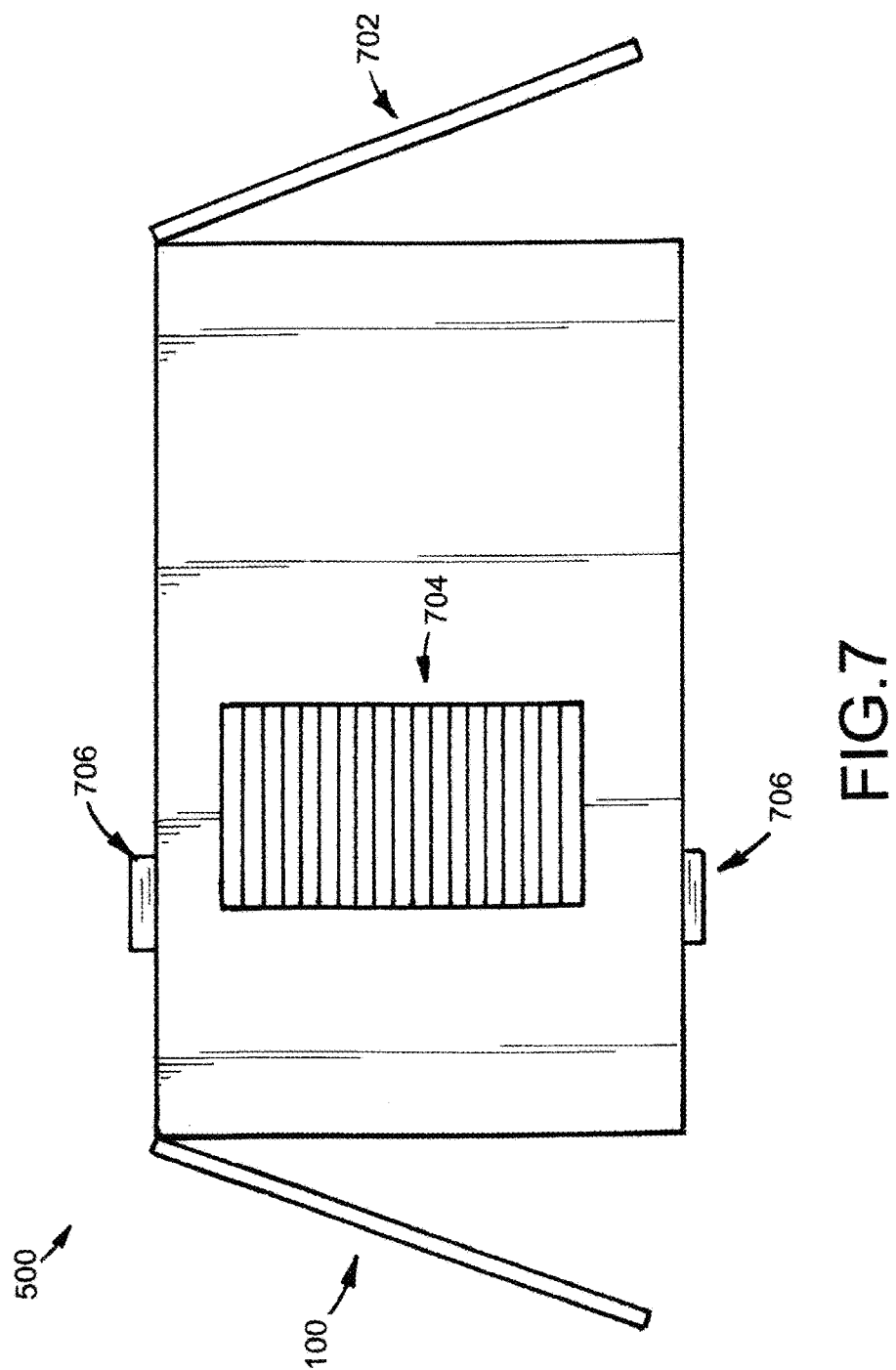

ELECTRICAL SWITCHGEAR MANUAL SAFETY SYSTEM AND MECHANISMS

CROSS REFERENCE TO RELATED APPLICATION

This application claims priority to Provisional Patent Application No. U.S. 62/255,519 entitled "Electrical Switchgear Manual Safety System and Mechanisms" by Neal Thomas Hare and Thomas Matthew Stevens filed on Nov. 15, 2015. That application is incorporated by reference in its entirety.

BACKGROUND

Switchgears are safety mechanisms that enclose circuit breakers to protect operators from being exposed to potentially lethal amounts of electrical current running though power distribution centers. Switchgears allow the operator to manipulate the circuit breaker as needed while preventing direct contact with the circuit breaker when it is coupled to a power supply.

In previous switchgear embodiments, there has been a tradeoff between operator accessibility and operator safety. Switchgears may allow easy operator access to the circuit breaker, but risk exposing an operator to an electrical current. Alternatively, switchgears may prevent access to the circuit breaker, requiring the operator to damage part of the switch ear in order to access the circuit breaker. There is a need in the industry for a switchgear that allows easy operator access that incorporates safety systems to prevent operator interaction with a circuit breaker while there is electrical current running through a switchgear.

SUMMARY

This disclosed invention has independent systems that may work individually or in concert to protect an operator from exposure to a powered circuit breaker. These are the Door Interlock Device (DID), the Manual Trip and Lockout (MT/L), and the Manual Racking Handle Exclusion Device (MRHED).

The DID comprises a series of locking mechanisms and sensors coupled to the circuit breaker access compartment door 100 and the cable access compartment door 702. These locking mechanisms and sensors are connected to a logic circuit or any device capable of equivalent operations. The logic circuit receives information from sensors throughout the switchgear 500 that prevent doors that restrict access to the circuit breaker 510 from being opened unless certain conditions are met.

The MT/L is a device that can disable the circuit breaker 510 within the switchgear 500 from an external switch on the circuit breaker access compartment door 100. By activating the switch, a decoupler 308 is activated, which will trip the circuit breaker 510.

The MRHED is an internal manipulation restriction device that prevents the use of a manual ratcheting handle from manipulating the racking device 108 that can move the circuit breaker 510 from a disengaged location to an engaged location within the switchgear 500. This is accomplished by obstructing the worm gear 112 while the circuit breaker access compartment door 100 is opened, preventing manipulation of the racking device 108 unless the circuit breaker access compartment door 100 is closed.

BRIEF DESCRIPTION OF DRAWINGS

FIG. 1a is an external view of a switchgear circuit breaker access compartment door 100 in an exemplary embodiment.

FIG. 2a is a view of the DID in an unlocked state in an exemplary embodiment.

FIG. 2b is a view of the DID in a locked state in an exemplary embodiment.

FIG. 2c is a view of the DID in an override state in an exemplary embodiment.

FIG. 6a is a view of the circuit breaker 510 coupled in the racking device 108 in the installation position with the rod 312 and the decoupler 308 omitted.

FIG. 6b is a view of the circuit breaker 510 coupled in the racking device 108 in the engaged position with the rod 312 and the decoupler 308 omitted.

FIG. 7 is a top down view of the switchgear 500 showing the circuit breaker access compartment door 100 and the cable access compartment door 702 in open positions.

DETAILED DESCRIPTION

Figure 1B:
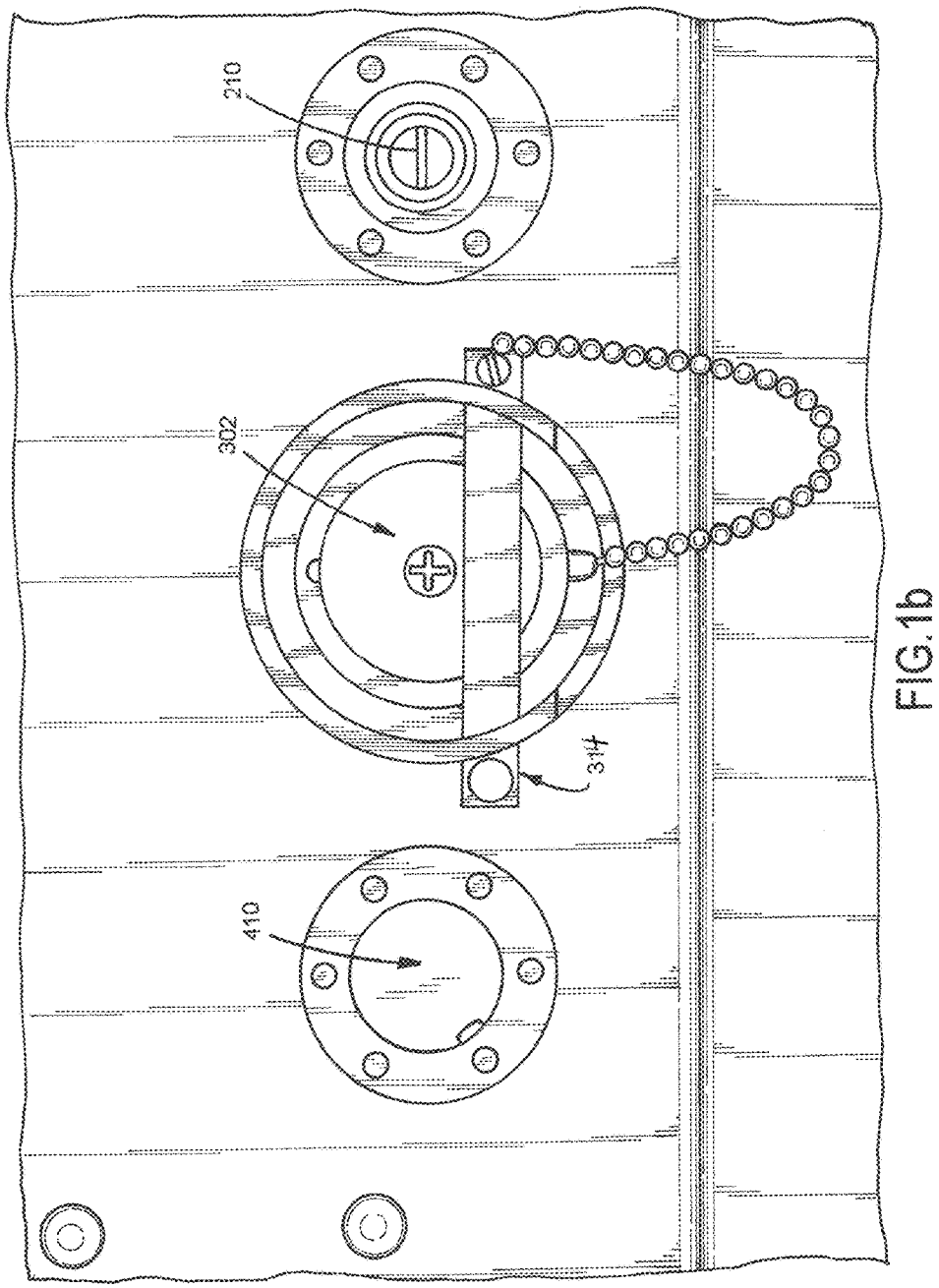
FIG. 1b is a view of an external section of the circuit breaker access compartment door 100 with the DID override 210 exposed, the MT/L switch button 302 with a switch restrictor 314, and the mechanical access outer aperture 410 exposed in an exemplary embodiment.
Figure 1C:
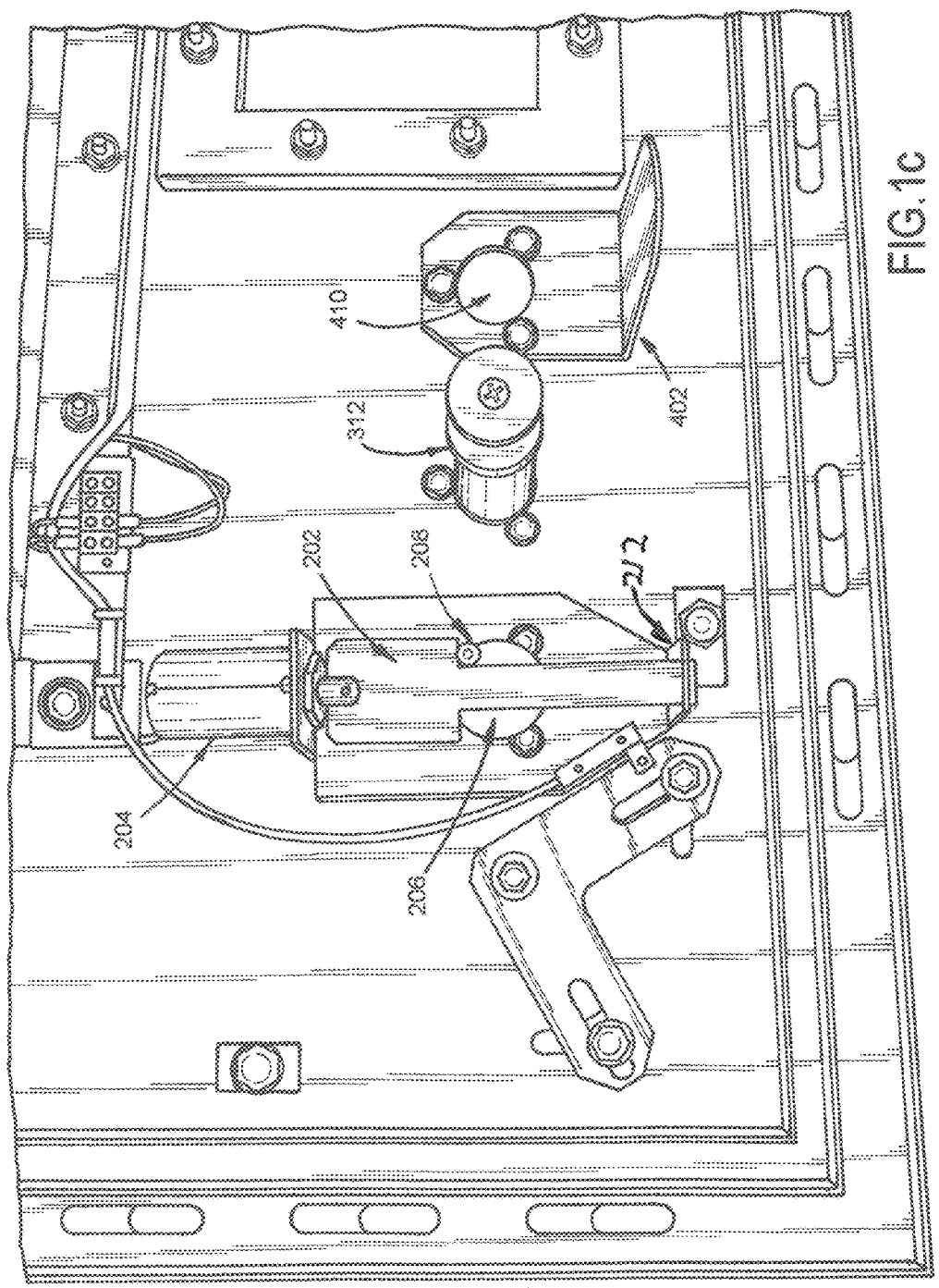
FIG. 1c is an internal view of a section of switchgear circuit breaker access compartment door 100 that corresponds to the elements show in FIG. 1b in an exemplar embodiment.
Figure 1D:
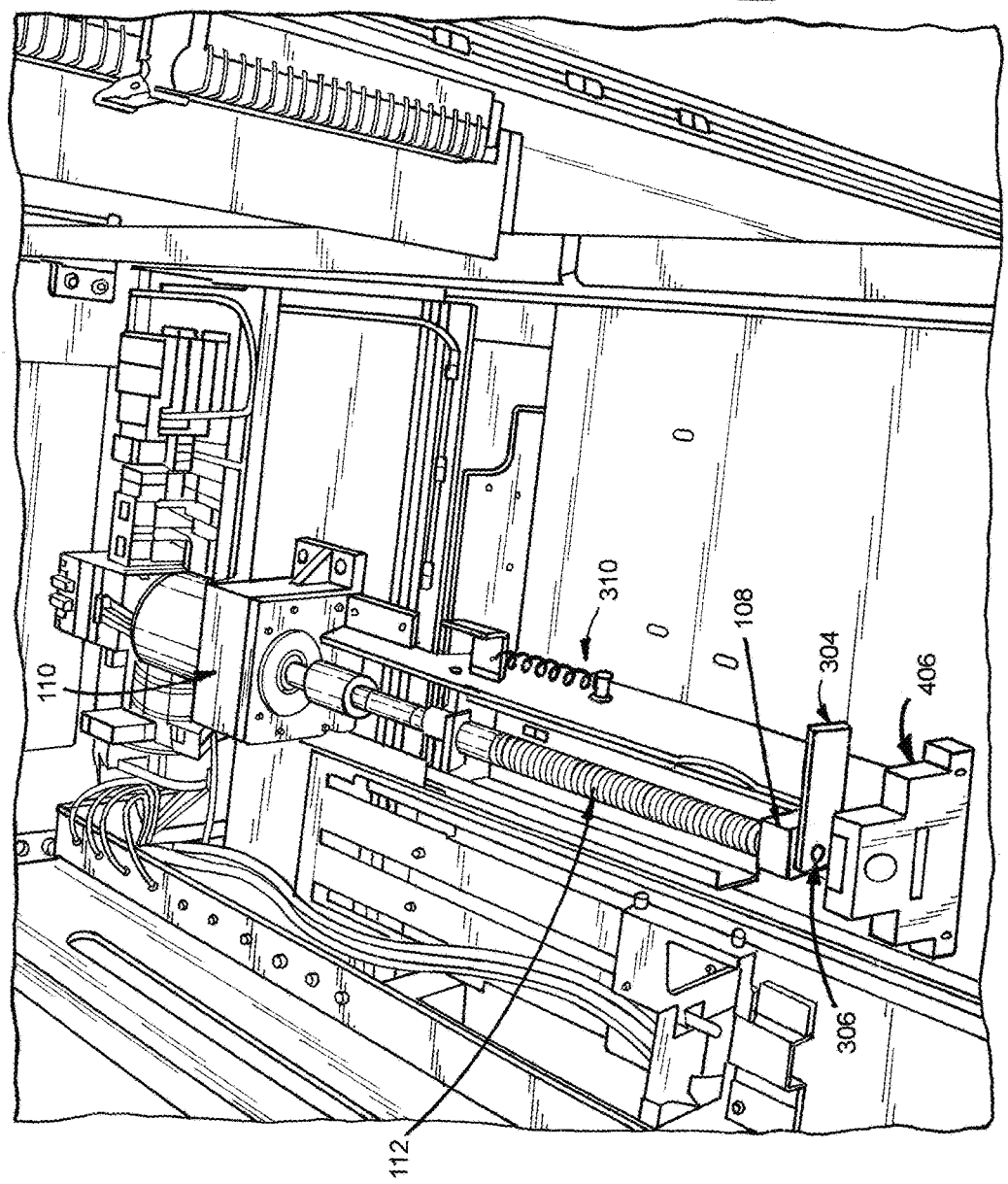
FIG. 1d is an internal view of the mechanism at the base of the switchgear 500 in an exemplary embodiment.

The interior of the switchgear 500 in an exemplary embodiment can be divided into two compartments: the circuit breaker access compartment 502 and the cable access compartment 504. The circuit breaker access compartment 502 is the location where the circuit breaker 510 resides when installed in the switchgear 500. The cable access compartment 504 is where the circuit breaker 510 interacts with the cables used for electrical power input and output. Dividing these two sections is a partition 508 that has two rows of three cylindrical apertures 514. The location of these cylindrical apertures 514 in the partition 508 corresponds to the connectors 512 from the circuit breaker 510. When the circuit breaker 510 is fully engaged as shown in FIG. 6B, the connectors 512 are inserted within these cylindrical apertures 514 to couple to the electrical power inputs and outputs in the cable access compartment 504. The cable access compartment door 702 is on the opposite side of the switchgear 500 from the circuit breaker access compartment door 100 in the exemplary embodiment and is used to access the power inputs and outputs for the switchgear 500.

The circuit breaker access compartment door 100 has a series of gauges and devices used by the operator to interact with the circuit breaker 510 within the switchgear 500 along with a manual locking mechanism 106. In the disclosed embodiment, the circuit breaker access compartment door 100 has a DID override 210, a MT/L button 302, and a MRHED mechanical access outer aperture 410. The cable access compartment door 702 also contains DID override 210 and a manual locking mechanism 106.

The casing of the switchgear 500 is arc resistant. The DID override 210 and the MRHED mechanical access outer aperture 410 are covered with an arc resistant cap 102 when not in use. Additionally, in the event of an overpressure within the switchgear 500, a series of vents 704 will open in the top surface, directing the force upward away from the operators.

The switchgear 500 has a racking device 108 where the circuit breaker 510 rests on the interior floor of the switchgear 500. The racking device 108 moves the circuit breaker 510 from the installation position to the engaged position by operation of a worm gear 112 acted on my the racking motor 110. When the racking device 108 is in the installation position shown in FIG. 6a, the circuit breaker 510 may be installed. The worm gear 112 then moves the circuit breaker 510 into the engaged position shown in FIG. 6b. The openings to the cylindrical apertures 514 are guarded by a series of louvers. As the racking device 108 moves the circuit breaker 510 into the engaged position, the louvers are opened, allowing the connectors 512 to pass through the cylindrical apertures 514 to couple with the power input and power output.

The cable access compartment 504 may be designed to receive power inputs and power outputs as needed. Additionally, the switchgear 500 may be connected with other switchgears via couplers 706 located on the sides of the switchgear 500. Other features for the switchgear 500 include a control mechanism capable of receiving remote commands to disconnect the circuit breaker 510. Such control mechanisms may be by any means known to those skilled in the art.

The disclosed invention contains elements that work individually and in concert to prevent operators from accessing the circuit breaker 510 unless the circuit breaker 510 is disengaged.

It is further understood that the disclosed invention may be practiced on an existing switchgear 500. Such modification would require minimal installation of equipment and physical modification of the switchgear housing. Further, this disclosed modification components could be provided as a kit, where all elements necessary to practice the invention would be provided.

Door Interlock Device (DID)

The DID is a locking system that restricts when the circuit breaker access compartment door 100 and the cable access compartment door 702 may be opened. The DID utilizes a series of sensors that provide input to a logic device, such as a primary logic circuit (PLC). In an exemplary embodiment, there are two proximity sensors for the circuit breaker access compartment door 100 and two proximity sensors for the cable access compartment door 702. One proximity sensor determines when a door is closed. A second proximity sensor determines when the manual locking mechanism 106 has been engaged for the same door. The inputs from these proximity sensors go into the logic circuit which dictates the status of the DID in an exemplary embodiment.

The DID uses a locking element, a deployment device, and a retraction device. In the exemplary embodiment, the DID comprises a locking bar 202 for the locking device, a lock spring for the deployment device, and a solenoid for a retraction device. The lock spring and the solenoid are contained in the spring/solenoid assembly 204. When the logic device determines that certain conditions are met, the solenoid in the spring/solenoid assembly 204 may receive power to unlock the door as shown in FIG. 2a. When the logic device determines that other conditions are present, or if it loses power, the solenoid in the spring/solenoid assembly 204 deactivates, and a lock spring forces the locking bar 202 into a lock receptacle 212 inside the switchgear 500, preventing the associated door from opening as shown in FIG. 2b. FIG. 2c illustrates how the locking bar 202 may be manipulated by use of a DID override 210 that will be explained below.

Figure 8:
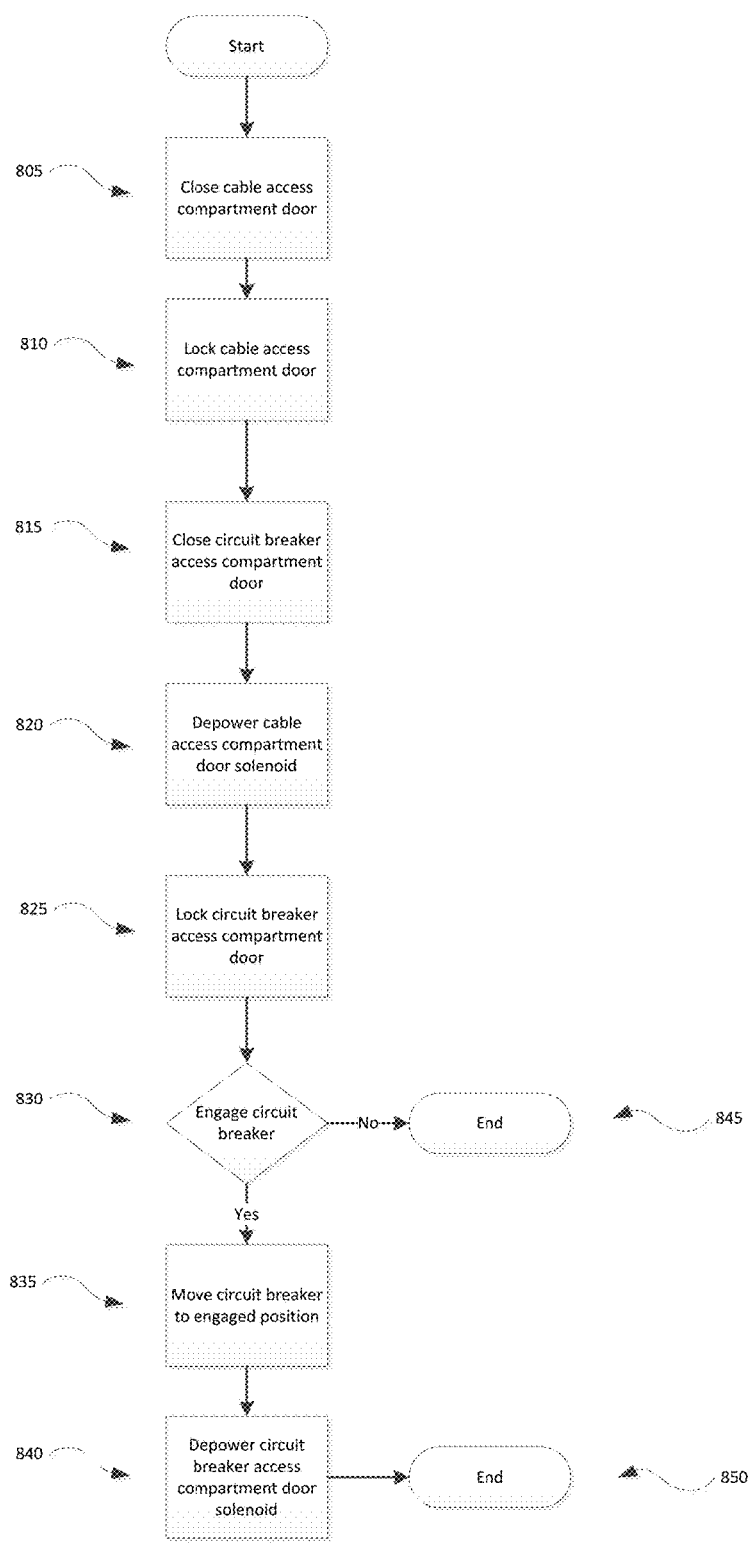
FIG. 8 is a flow chart illustrating the logic of the DID to close a door.

The DID operates once the circuit breaker 510 is installed n the switchgear 500. The process is illustrated in FIG. 8 with both the cable access compartment door 702 open and the circuit breaker access compartment door 100 initially open. The open cable access compartment door 702 facilitates the coupling of the switchgear 500 to the applicable electrical system. The process begins when the cable access compartment door 702 is closed (step 805), tripping the first cable access compartment door proximity sensor. The locking of the cable access compartment door 702 via the manual locking mechanism 106 of the cable access compartment door 702 (step 810) trips the second cable access compartment door proximity sensor. The circuit breaker 510 is coupled to the racking device 108 that can move the circuit breaker 510 from an installation position to a test position to an engaged position. The circuit breaker access compartment door 100 is closed (step 815), and this closure is detected by the first circuit breaker access compartment door proximity sensor. The cable access compartment door 702 solenoid now depowered (step 820), causing the spring in the spring/solenoid assembly 204 to push the locking bar 202 into the lock receptacle 212 locking the cable access compartment door 702. The locking of the circuit breaker access compartment door 100 (step 825) by the manual locking mechanism 106 trips the second circuit breaker access compartment door proximity sensor.

Once both of the proximity sensors for the circuit breaker access compartment door 100 indicate closed, the circuit breaker 510 may be moved to an engaged position (step 830). If the operator does not wish to engage the circuit breaker 510, then the process concludes (step 845).

If the operator wants the circuit breaker 510 to engage (step 830) then the circuit breaker 510 is moved into the engaged position step 835). The circuit breaker 510 begins in the disengaged position as shown in FIG. 6a. Once the circuit breaker 510 has left the disengaged position, the circuit breaker access compartment door 100 solenoid is now depowered (step 840), causing the spring in the spring/solenoid assembly 204 to push the locking bar 202 into the lock receptacle 212, locking the circuit breaker access compartment door 100. The process then concludes (step 850). The circuit breaker 510 is now engaged as shown in FIG. 6b. The switchgear 500 will remain locked until the logic circuit energizes the solenoids or a DID override 210 is used.

A circuit breaker proximity sensor monitors the location of the circuit breaker 510 within the switchgear 500. The logic device will not allow a circuit breaker access compartment door 100 to open unless the circuit breaker 510 is in a disengaged position. Concurrently, the logic device will not allow the cable access compartment door 702 to open unless the circuit breaker access compartment door 100 is open in an exemplary embodiment.

Figure 9:
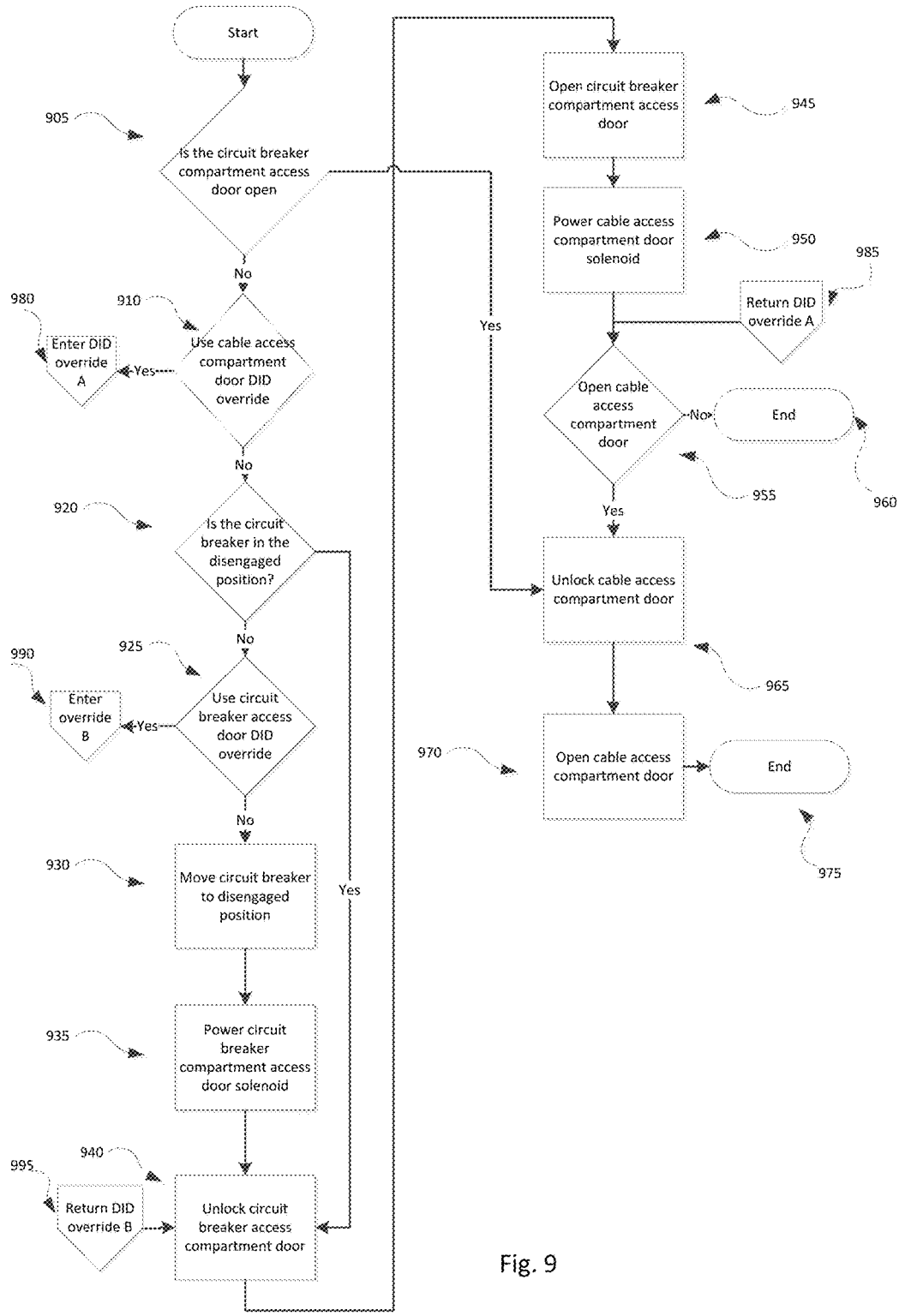
FIG. 9 is a flow chart illustrating the logic of the DID to open a door.
Figure 10:
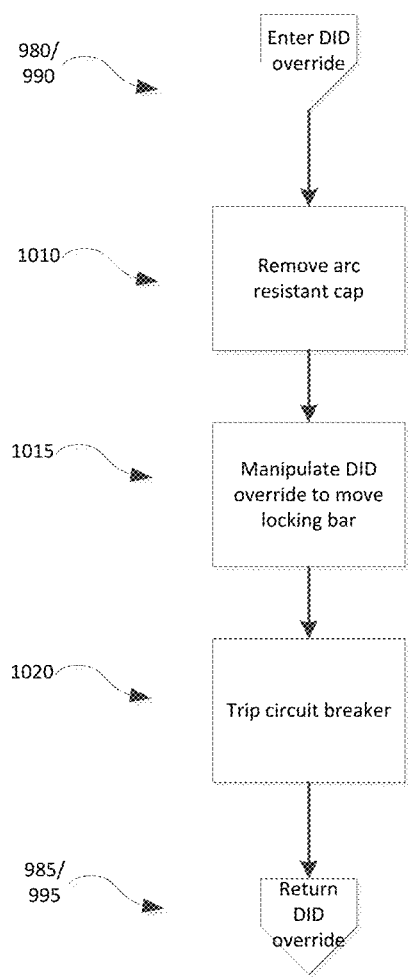
FIG. 10 is a flow chart illustrating the logic of the DID to use the DID override 210 to open a door.

FIG. 9 is an illustrative flowchart showing an exemplary embodiment of how the logic may be set up to open all doors once the DID is engaged for both doors. If an operator wants to open the cable access compartment door 702 locked by the DID, then he would see if the circuit breaker access door 100 was open (step 905). If the circuit breaker access door 100 is open, then the cable access compartment door 702 may be unlocked (step 965) and opened (step 970), ending the process (step 975). If the circuit breaker access door 100 is not open, then the operator decides whether or not to use the DID override 210 on the cable access compartment door 702 (step 910). If he chooses not to use the DID override 210, then the logic circuit determines if the circuit breaker 510 is in the disengaged position (step 920). If the circuit breaker 510 is not in a disengaged position, the operator would decide whether or not to use the circuit breaker access door DID override 210 (step 925). If he chose not to, then the circuit breaker 510 needs to he moved to a disengaged position (step 930). Once the circuit breaker 510 is in the disengaged position, the solenoid for the spring/solenoid assembly 204 for the circuit breaker access compartment door 100 will power up, and the locking bar 202 will retract from the locking receptacle 212 (step 935). The circuit breaker access compartment door 100 may be unlocked (step 940) and opened (step 945). Opening the circuit breaker access compartment door 100 triggers the logic circuit to power the solenoid in the spring/solenoid assembly 204 for the cable access compartment door 702 (step 950). The operator can the choose if wants to open the cable access compartment door 702 (step 955) to then unlock (step 965) and open (step 970) the cable access compartment door 702. Alternatively, if the circuit breaker 510 was already in a disengaged position (step 920), then multiple steps may be bypassed and proceed to unlocking the circuit breaker access door 100 (step 940) and proceeding as previously disclosed.

If the DID override 210 is used to open either the circuit breaker access compartment door 100 or the cable access compartment door 702, then the applicable proximity sensors will indicate that the doors are not secured. In an exemplary embodiment, the PLC will electronically trip the circuit breaker 510 to return it to a non-powered state.

Different scenarios require different paths through the logic of the DID. In the event that the operator only wanted to open the circuit breaker access compartment door 100, then the process would begin by determining if the circuit breaker 510 was in the disengaged position (step 920). The logic would proceed as in the above disclosed exemplary embodiment.

In the exemplary embodiments, when either the cable access compartment door 702 or the circuit breaker access compartment door 100 needs to be opened, and the logic device prevents this due to its programming or due to a lack of power to energize the solenoids as shown in FIG. 2b, a DID override 210 is available. In the exemplary embodiment, there is a DID override 210 on both the circuit breaker access compartment door 100 and the cable access compartment door 702. The DID override 210 is covered with an arc resistant cap 102, making it part of the arc resistant surface 104 of the switchgear 500. An operator would remove the arc resistant cap 102 (step 1010). Once the arc resistant cap 102 is removed, the DID override 210 is exposed. Using a specially designed tool to interface with the DID override 210, the locking bar 202 may be retracted from the lock receptacle 212 (step 1015). In an exemplary embodiment, the rotation of the DID override 210 rotates the cam 206 with the knob 208 located adjacent the locking bar 202. When the knob 208 moves, it exerts force on the locking bar 202 that pushes the locking bar 202 against the force of the lock spring in the spring/solenoid assembly 204, removing the locking bar 202 from the lock receptacle 212 as shown in FIG. 2c. The result is the locking bar 202 no longer locks the associated door, allowing the door to be opened by operating the manual locking mechanism 106. The action also trips the circuit breaker 510 (step 1020) in the exemplary embodiment to prevent power flow when opening the applicable door.

The use of the DID override 210 in the exemplary embodiment allows the logic circuit to be bypassed from previous exemplary embodiment in this disclosure. It an operator wants to open the cable access compartment door 702 and chooses to use the DID override 210 (step 980), then the operator removes the arc resistant cap 102 (step 1010) and manipulates the DID override 210 to move the locking bar 202 to act against the spring in the spring/solenoid assembly 204 (step 1015). The circuit breaker 510 is now tripped (step 1020). The operator then leaves the DID override 210 (step 985). The operator may choose to unlock the cable access compartment door 702 (step 955) as previously disclosed.

If an operator wants to open the circuit breaker access compartment door 100 and chooses to use the DID override 210 (step 990), then the operator removes the arc resistant cap 102 (step 1010) and manipulates the DID override 210 to move the locking bar 202 to act against the spring in the spring/solenoid assembly 204 (step 1015). The circuit breaker 510 is now tripped (step 1020). The operator then leaves the DID override 210 (step 995). The operator may unlock (step 940) and open (step 945) the circuit breaker access compartment door 100. Additionally, with the circuit breaker access compartment door 100 opened, the spring/solenoid assembly 204 on the cable access compartment door 702 may be powered (step 950). The operator may choose to open the cable access compartment door 702 (step 955). This allows the cable access compartment door to be unlocked (step 965) and opened (step 970). Alternatively, the operator may choose not to open the cable access compartment door 702, ending the process (step 960)

Mechanical Trip and Lockout (MT/L)

Figure 4A:
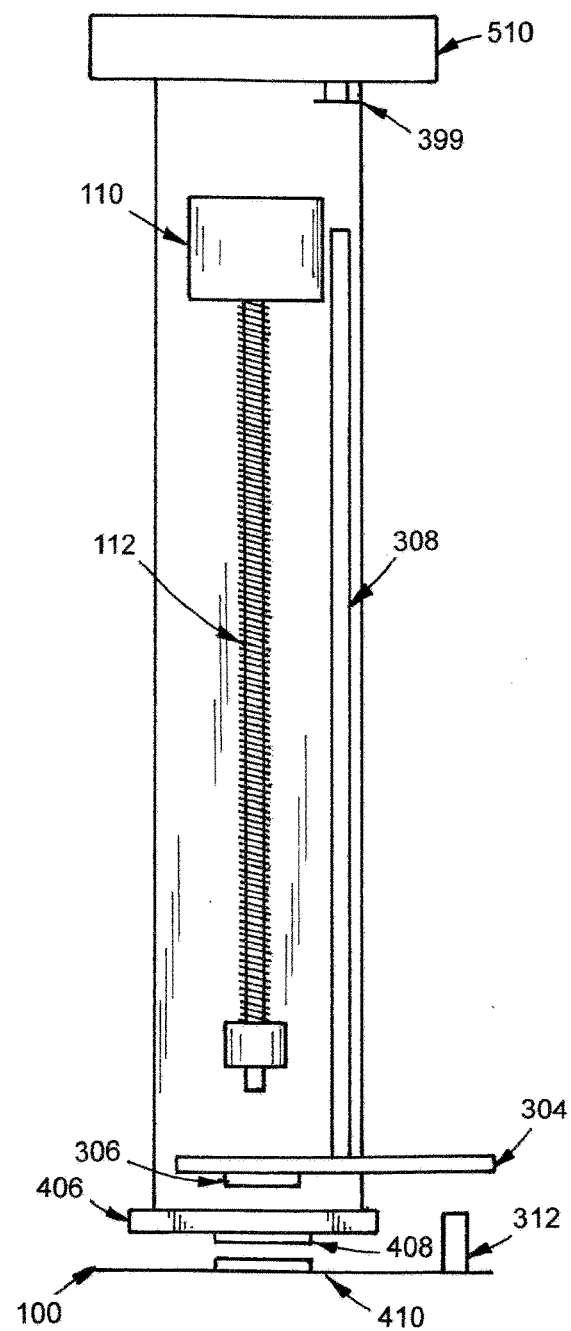
FIG. 4a is a view of the MT/L integrated with a MRHED in a non-tripped state in an exemplary embodiment.
Figure 4B:
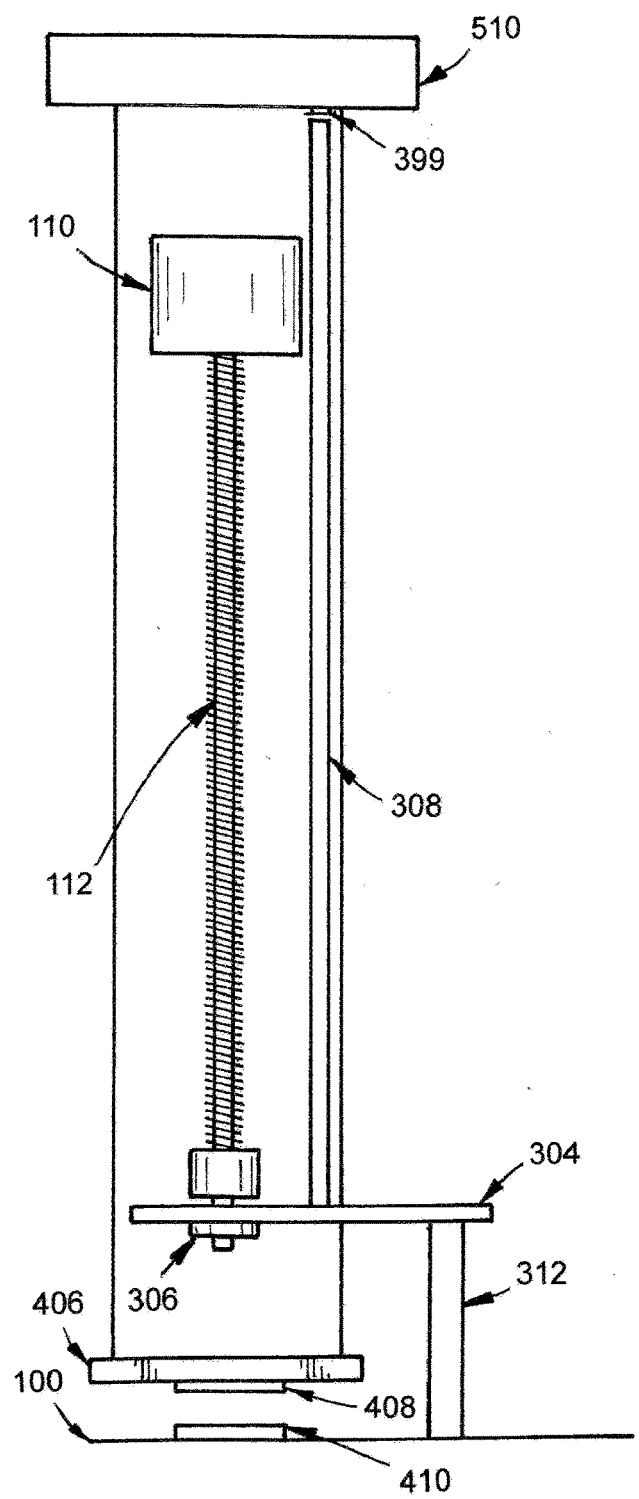
FIG. 4b is a view of the MT/L integrated with a MRHED in a tripped state in an exemplary embodiment.
Figure 5A:
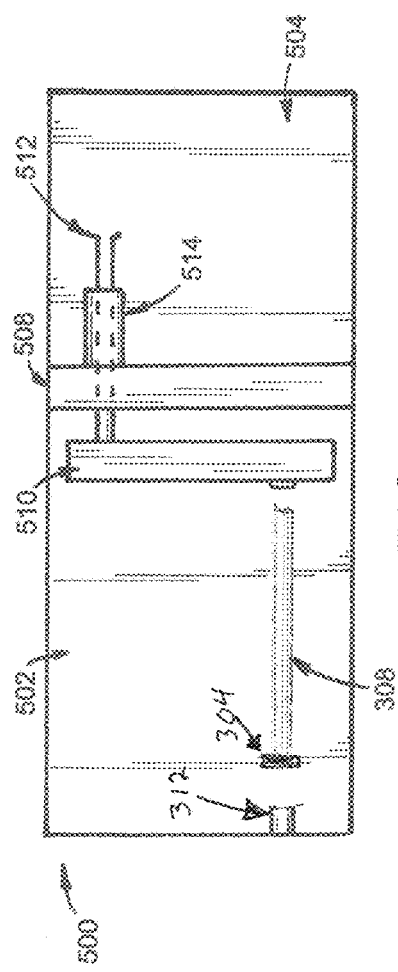
FIG. 5a is a view of the MT/L with the decoupler 308 in a non-tripped position with the worm gear 112 omitted.
Figure 5B:
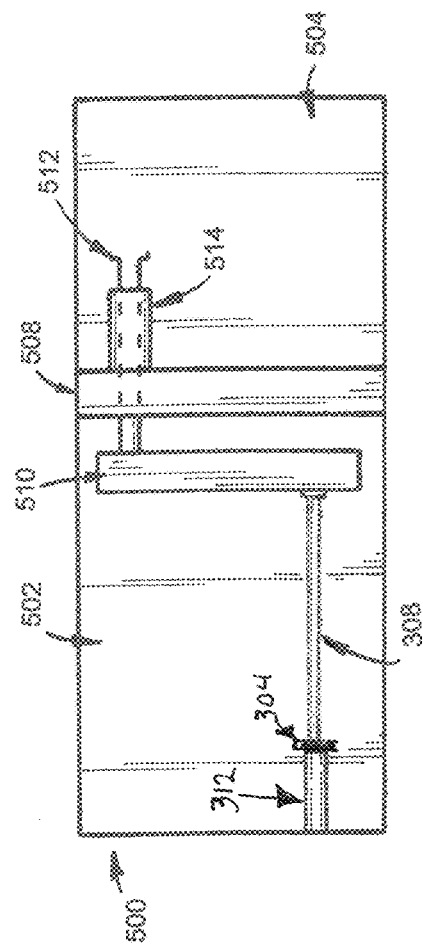
FIG. 5b is a view of the MT/L with the decoupler 308 in a tripped position and acting on the circuit breaker 510 with the worm gear 112 omitted.

The MT/L is a circuit breaker trip device than comprises a MT/L switch, a strike plate 304, and the decoupler 308. The MT/L switch comprises a spring loaded button 302 and a rod 312 operated by the spring loaded button 302. The button 302 for the MT/L switch extends from the outer surface of the circuit breaker access compartment door 100. The button 302 is in communication with the rod 312, which extends from the inner surface of the circuit breaker access compartment door 100. The rod 312 is normally in a retracted position as show in FIGS. 4a and 5a. When the button 302 is depressed, the rod 312 acts on a strike plate 304. Coupled to the strike pate is a decoupler 308. The decoupler 308 in the exemplary embodiment is a projection that lines up with an external tripping mechanism 399 of an engaged circuit breaker 510. When the rod 312 acts on the strike plate 304, the strike plate 304 then moves away from the circuit breaker access compartment door 100, and the decoupler 308 is pushed back as shown in FIGS. 4b and 5b. The decoupler 308 then makes contact with the circuit breaker external tripping mechanism 399, deactivating the circuit breaker 510. The decoupler 308 further comprises a mechanism to return the decoupler 308 back to its disengaged position when the button 302 is not depressed. In the exemplary embodiment, the mechanism is a decoupler spring 310.

Once the circuit breaker external tripping mechanism 399 has engaged, the circuit breaker 510 will remain disengaged unless it is reactivated by a means known to those skilled in the art. The MT/L has an additional option where the cover for the button 302 may further include a mechanism to keep the button 302 in the depressed position. In the exemplary embodiment, the mechanism is a switch restrictor 314.

The MT/L may be connected to the MRHED described below such that when the mechanical ratchet is attached this engages the MT/L system as well in an exemplary embodiment.

Manual Racking Handle Exclusion Device
(MRHED)

The MRHED is a mechanism that restricts manual operation of an element within the switchgear 500. In an exemplary embodiment, the MRHED allows manual operation of the worm gear 112 to move the racking device 108 only when the circuit breaker access compartment door 100 is closed. When an operator wants to have the circuit breaker 510 moved to a disengaged position, the operator may use a mechanical ratchet to manipulate the worm gear 112 to move the racking device 108, causing the circuit breaker 510 to decouple from the power inputs and power outputs. The MRHED operates in a manner that requires the circuit breaker access compartment door 100 to be closed when using the mechanical ratchet to move the circuit breaker racking device 108.

In the exemplary embodiment, the MRHED has components that are fixed to the interior of the circuit breaker access compartment 502 and components that are integrated into the inner surface of the circuit breaker access compartment door 100. The circuit breaker access compartment door 100 comprises a mechanical access outer aperture 410 and a tongue 402 that extends perpendicularly from the interior surface of the circuit breaker access compartment door 100. The mechanical access outer aperture 410 is covered with an arc resistant cap 102, maintaining the arc resistant integrity of the switchgear 500.

Figure 3A:
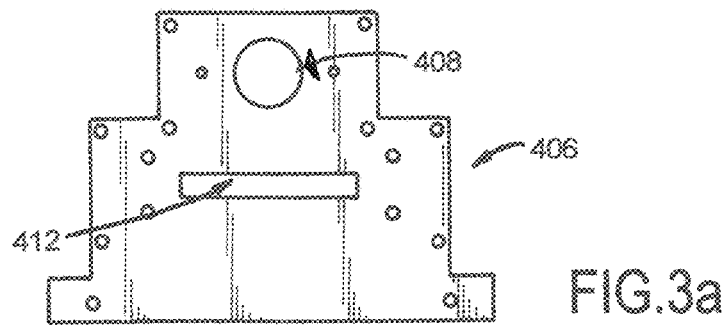
FIG. 3a is a view of a mechanical gateway 406 without any shutters 414 in an exemplary embodiment.
Figure 3B:
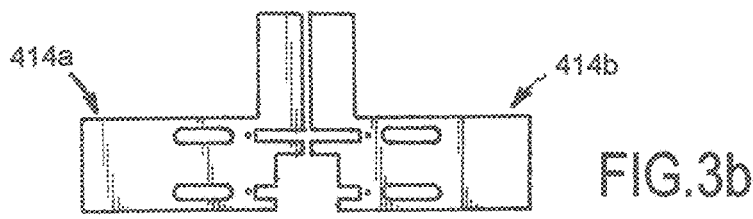
FIG. 3b is a view of the shutters 414 in an exemplary embodiment.
Figure 3C:
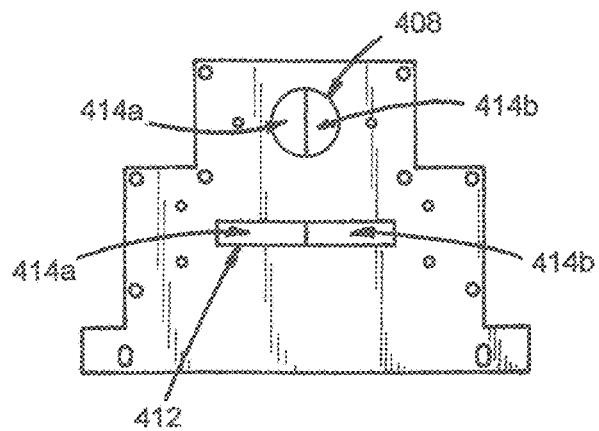
FIG. 3c is a view of a mechanical gateway 406 in a closed state in an exemplary embodiment.
Figure 3D:
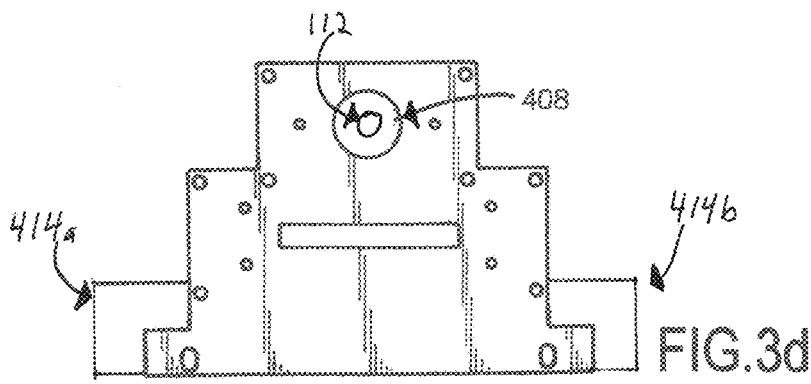
FIG. 3d is a view of a mechanical gateway 406 in an opened state in an exemplary embodiment.

In the exemplary embodiment, a mechanical gateway 406 is positioned between the end of the worm gear 112 and the location of the mechanical access outer aperture 410 when the circuit breaker access compartment door 100 is closed. The mechanical gateway 406 comprises a mechanical access inner aperture 408, and a mechanical shutter interface 412 as shown in FIG. 3a. The mechanical gateway 406 has a set of mechanical shutters 414 shown in FIG. 3b that are used to open and close the mechanical gateway 406 in accordance with the exemplary embodiment In an exemplary embodiment, the mechanical access inner aperture 408 is closed as shown in FIG. 3c when the circuit breaker compartment access door 100 is open. When the circuit breaker access compartment door 100 is closed, the tongue 402 enters the mechanical shutter interface 412 and forces the mechanical shutters 414 to separate, opening the mechanical access inner aperture 408 as shown in FIG. 3d. The arc resistant cap 102 may be removed, exposing the mechanical access outer aperture 410. With both the mechanical access outer aperture 410 and the mechanical access inner aperture 408 open, a mechanical ratchet may now interface with the worm gear 112 to manipulate the racking device 108.

In a further exemplary embodiment, the strike plate 304 of the previously discussed MT/L maybe modified to interface with the MRHED. In an exemplary embodiment, the strike plate 304 may contain a strike plate aperture 306 as shown in FIGS. 4a and 4b. The strike plate aperture 306 may be positioned to line up with the mechanical access outer aperture 410 and the mechanical access inner aperture 408. This would not interfere with the manipulation of the worm gear 112 as the strike plate aperture 306 allows unobstructed access to the worm gear 112. The strike plate aperture 306 may be large enough for the worm gear 112 to pass through, but not wide enough for the head of the mechanical ratchet. By placing the mechanical ratchet in contact with the worm gear 112, the mechanical ratchet will push on the strike plate 304, activating the MT/L and tripping the circuit breaker 510 as shown in FIG. 4b. This exemplary embodiment would have the ratchet mimic the function of the rod 312 from the MT/L.

One of skill in the art will appreciate that embodiments provide improved switchgears and improved electrical safety mechanisms at any location where high voltage electrical components are located. Although specific embodiments are illustrated and described herein, it will be appreciated by those of ordinary skill in the art that any arrangement which is calculated to achieve the same purpose can be substituted for the specific embodiments shown. This specification is intended to cover any adaptations or variations of embodiments. In particular, one of skill in the art will appreciate that the names and terminology are not intended to limit embodiments. Furthermore, additional apparatus can be added to the components, functions can be rearranged among components, and new components corresponding to future enhancements and future physical devices used in embodiments can be introduced without departing from the scope of the invention. The terminology used in this application is intended to include all embodiments and alternatives which provide the same functionality as described herein.

The invention claimed is:

1. A circuit breaker disabling device for acting on a circuit breaker within an enclosure, comprising:
   a) a switch on an external surface of said enclosure;
   b) a manipulator aperture on said external surface of said enclosure;
   c) a projection in communication with said switch on an interior surface of said enclosure;
   d) a strike plate that may be acted on by at least one of said projection when said switch is activated or a manipulator is inserted through said manipulator aperture; and
   e) a trip projection in communication with said strike plate;
   f) wherein said switch may be moved to an active position by an outside force;
   g) wherein said switch may cause said projection to act on said strike plate,
   h) wherein said manipulator may be inserted through said manipulator aperture and act on said strike plate;
   i) wherein said strike plate moves said trip projection to an active position after being acted on by at least one of said manipulator and said projection; and
   j) wherein said trip projection toggles an external tripping mechanism on said circuit breaker.

2. The system of claim 1, wherein said trip projection acts on said circuit breaker when said projection acts on said strike plate.

3. The system of claim 1, wherein said projection returns to a retracted position when said switch is in an inactive position.

4. The system of claim 1, wherein said switch returns to an inactive position when no longer acted on by an external force.

5. The system of claim 1, wherein said switch may be held in an active position by the use of a switch restrictor.

6. The system of claim 1, wherein said trip projection acts on said circuit breaker when said manipulator acts on said strike plate.

7. The system of claim 1, wherein said projection returns to a retracted position when said manipulator is withdrawn.

\* \* \* \* \*